(12) United States Patent
Phillips et al.

(10) Patent No.: US 11,260,607 B2
(45) Date of Patent: Mar. 1, 2022

(54) FORMING SYSTEMS AND METHODS FOR DRAPE FORMING A COMPOSITE CHARGE

(71) Applicant: The Boeing Company, Chicago, IL (US)

(72) Inventors: Richard V. Phillips, Enumclaw, WA (US); Jordan Oliver Birkland, Lynnwood, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 16/787,865

(22) Filed: Feb. 11, 2020

(65) Prior Publication Data

US 2021/0245458 A1 Aug. 12, 2021

(51) Int. Cl.
*B29C 70/54* (2006.01)
*B29C 70/44* (2006.01)
*B29L 31/30* (2006.01)

(52) U.S. Cl.
CPC .......... *B29C 70/541* (2013.01); *B29C 70/44* (2013.01); *B29L 2031/3082* (2013.01)

(58) Field of Classification Search
CPC ....... B29C 70/541; B29C 70/44; B29C 33/76; B29L 2013/3082
See application file for complete search history.

(56) References Cited

U.S. PATENT DOCUMENTS

| | | |
|---|---|---|
| 3,540,079 A | 11/1970 | Bush |
| 3,614,811 A | 10/1971 | Johnson |
| 4,568,588 A | 2/1986 | Fujiki et al. |
| 5,015,168 A | 5/1991 | Boime et al. |
| 5,092,954 A | 3/1992 | Braun et al. |
| 5,340,301 A | 8/1994 | Saffire et al. |
| 5,348,602 A | 9/1994 | Makarenko et al. |
| 5,427,518 A | 6/1995 | Morizot et al. |
| 6,814,916 B2 | 11/2004 | Willden et al. |
| 7,959,753 B2 | 6/2011 | Nunez Delgado et al. |
| 8,029,719 B2 | 10/2011 | Petersson et al. |
| 8,052,826 B2 | 11/2011 | Burpo et al. |
| 8,142,181 B2 | 3/2012 | Willden et al. |

(Continued)

FOREIGN PATENT DOCUMENTS

| | | |
|---|---|---|
| GB | 2486231 | 6/2012 |
| WO | WO 2012/076875 | 6/2012 |
| WO | WO 2012/148472 | 11/2012 |

*Primary Examiner* — Vishal I Patel
(74) *Attorney, Agent, or Firm* — Dascenzo Gates Intellectual Property Law, P.C.

(57) ABSTRACT

Forming systems and methods for drape forming a composite charge are disclosed herein. The forming systems include a forming die having a forming surface and a collapsible support having a support surface. The collapsible support is configured to transition from an extended conformation to a collapsed conformation and is configured such that a gap width of a gap between the support surface and the forming surface decreases during the transition. The methods include positioning a composite charge, transitioning the collapsible support from an extended conformation to a collapsed conformation, decreasing the gap width of the gap as the collapsible support transitions from the extended conformation to the collapsed conformation, and deforming the composite charge from an initial conformation to a final conformation.

20 Claims, 9 Drawing Sheets

(56) References Cited

U.S. PATENT DOCUMENTS

| | | |
|---|---|---|
| 8,236,222 B2 | 8/2012 | Henderson et al. |
| 8,465,613 B2 | 6/2013 | Rotter et al. |
| 8,601,694 B2 | 12/2013 | Brennan et al. |
| 9,023,265 B1 | 5/2015 | Rotter et al. |
| 9,144,959 B1 | 9/2015 | Rotter et al. |
| 9,464,642 B2 | 10/2016 | Ilievski et al. |
| 9,541,094 B2 | 1/2017 | Iwakiri et al. |
| 9,573,301 B2 | 2/2017 | Kline et al. |
| 9,914,268 B2 | 3/2018 | Coxon et al. |
| 10,150,233 B2 | 12/2018 | Kline et al. |
| 2008/0105128 A1 | 5/2008 | Yang |
| 2009/0091052 A1 | 4/2009 | Pridie |
| 2012/0153531 A1 | 6/2012 | Rober et al. |
| 2015/0352795 A1* | 12/2015 | Coxon ................... B29C 70/78 264/266 |
| 2018/0126604 A1* | 5/2018 | Tokutomi ................ B29C 53/02 |

* cited by examiner

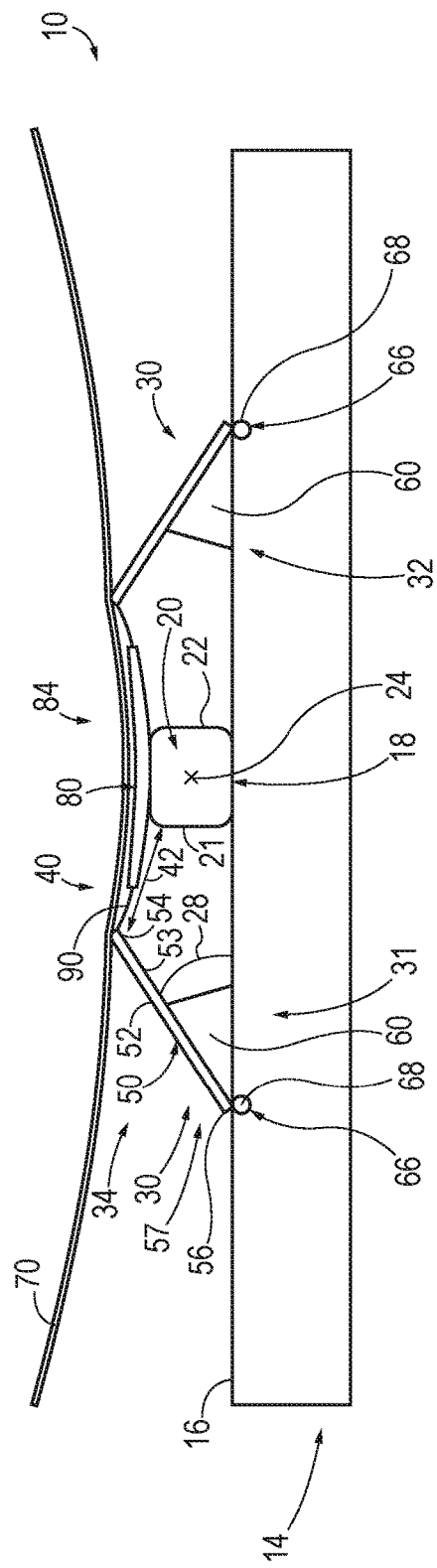

ns and Methods for Drape Forming a Composite Charge

FIELD

The present disclosure relates generally to forming systems and/or methods for drape forming a composite charge.

BACKGROUND

Historically, construction of composite structures that define non-planar surface contours has been a serial process in which a plurality of plies of composite material is located layer-by-layer on a layup mandrel. While such a process may be effective, it may be inefficient and/or costly to implement, especially with larger and/or more complex composite structures. As composite structures become more complex, such as may be the case for airplanes and/or portions thereof, a time required to complete such a layer-by-layer assembly may become significant.

More recently, drape-forming processes have been developed that permit layered charges of composite material to be formed and/or laid up on a flat, or at least substantially flat, surface and subsequently deformed to a final, or desired, shape. However, deformation of the layered charge may induce undesired buckles and/or wrinkles within the layered charge, and these buckles and/or wrinkles may preclude the use of a conventional drape forming process in certain applications, such as aircraft construction. Thus, there exists a need for improved forming systems and methods for drape forming a composite charge.

SUMMARY

Forming systems and methods for drape forming a composite charge are disclosed herein. The forming systems include a forming die having a forming surface and a collapsible support having a support surface. The collapsible support is configured to transition from an extended conformation to a collapsed conformation and is configured such that a gap width of a gap between the support surface and the forming surface decreases during the transition.

The methods include positioning a composite charge within a forming system such that a first region of the composite charge is supported by a forming surface of a forming die and also such that a second region of the composite charge is at least indirectly supported by a support surface of a collapsible support. The collapsible support and the forming surface define a gap therebetween. The methods also include transitioning the collapsible support from an extended conformation to a collapsed conformation, decreasing a gap width of the gap as the collapsible support transitions from the extended conformation to the collapsed conformation, and deforming the composite charge from an initial conformation to a final conformation that defines a desired surface contour.

BRIEF DESCRIPTION OF THE DRAWINGS

FIG. 9 is a less schematic side view illustrating an example of a drape forming system according to the present disclosure.

FIG. 10 is another less schematic side view illustrating examples of the drape forming system of FIG. 9.

DESCRIPTION

Figure 1:
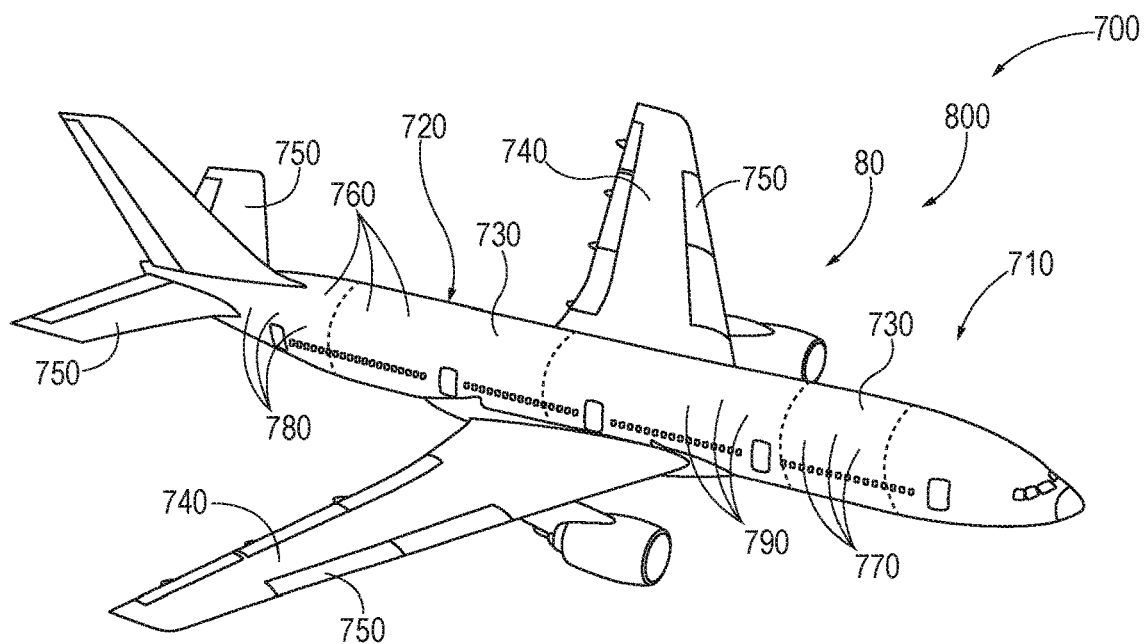
FIG. 1 is a schematic illustration of an example of an aircraft that may be at least partially formed utilizing the drape forming systems and/or methods, according to the present disclosure.

FIGS. 1-13 provide examples of forming systems 10, of methods 200, and/or of composite structures 800 that may be formed utilizing forming systems 10 and/or methods 200, according to the present disclosure. Elements that serve a similar, or at least substantially similar, purpose are labeled with like numbers in each of FIGS. 1-13, and these elements may not be discussed in detail herein with reference to each of FIGS. 1-13. Similarly, all elements may not be labeled in each of FIGS. 1-13, but reference numerals associated therewith may be utilized herein for consistency. Elements, components, and/or features that are discussed herein with reference to one or more of FIGS. 1-13 may be included in and/or utilized with any of FIGS. 1-13 without departing from the scope of the present disclosure.

In general, elements that are likely to be included in a given (i.e., a particular) embodiment are illustrated in solid lines, while elements that are optional to a given embodiment are illustrated in dashed lines. However, elements that are shown in solid lines are not essential to all embodiments, and an element shown in solid lines may be omitted from a particular embodiment without departing from the scope of the present disclosure.

Figure 2:
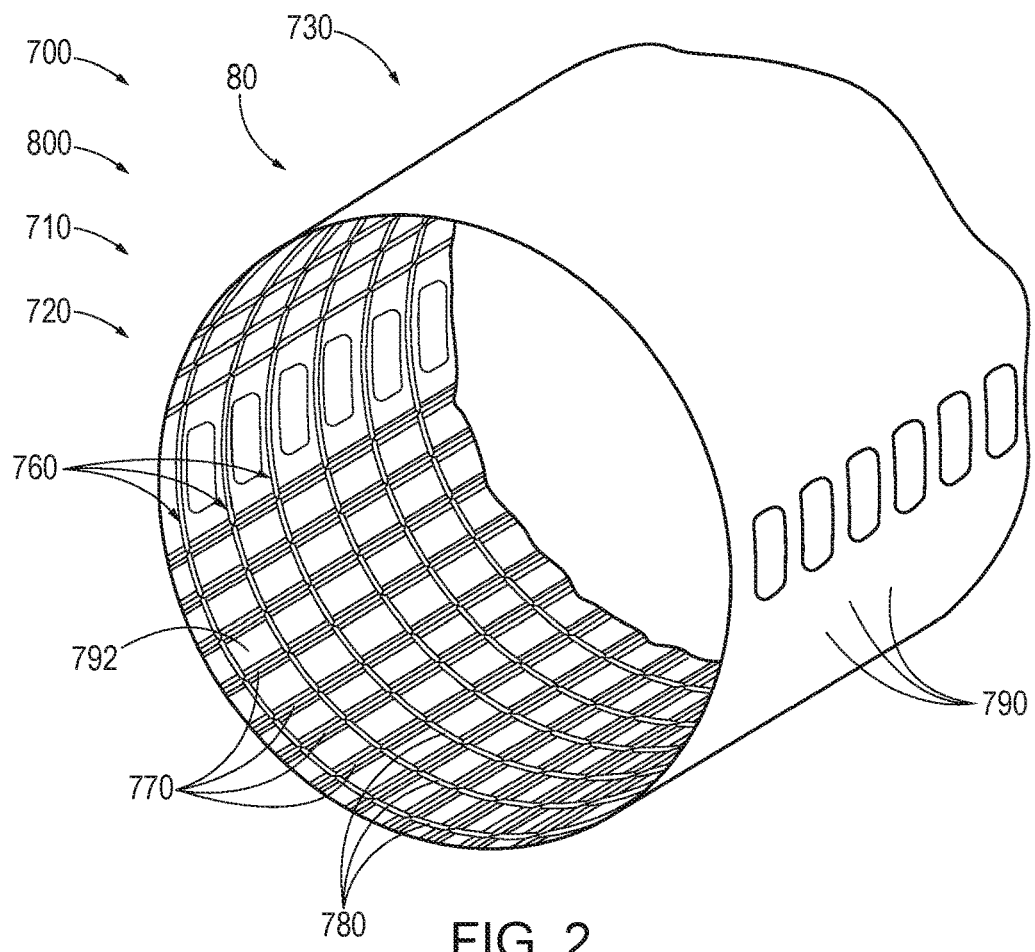
FIG. 2 is a schematic illustration of an example of a fuselage barrel that may form a portion of the aircraft of FIG. 1.

FIG. 1 is an example of an aircraft 700 that includes a composite structure 800 that may be constructed utilizing composite charges 80. Composite charges 80 may be formed using the systems and methods according to the present disclosure. FIG. 2 is an example of a fuselage barrel 730 that may form a portion of aircraft 700 and includes composite structure 800 that may be constructed utilizing composite charges 80. Aircraft 700 and/or composite structure 800 thereof may include a plurality of skin segments 790 that may form, cover, and/or be an outer surface of any suitable portion of aircraft 700, and skin segments 790 may include, be formed from, and/or be constructed utilizing composite charges 80. As perhaps illustrated most clearly in FIG. 2, aircraft 700 also may include a plurality of stringers 770 that, together with a plurality of frames 780, may support an inner surface 792 of skin segments 790. A plurality of fillers 760 may extend between frames 780 and inner surface 792 and may form a portion of composite structure 800. Similar to skin segments 790, stringers 770, frames 780, and/or fillers 760 may include, be formed from, and/or be constructed utilizing composite charges 80. It is within the scope of the present disclosure that any suitable portion of aircraft 700 may be formed from and/or be composite structure 800. As additional examples, composite structure 800 may form, or form a portion of, an airframe 710, a fuselage 720, a fuselage barrel 730, a wing 740, and/or a stabilizer 750 of aircraft 700.

Figure 4:
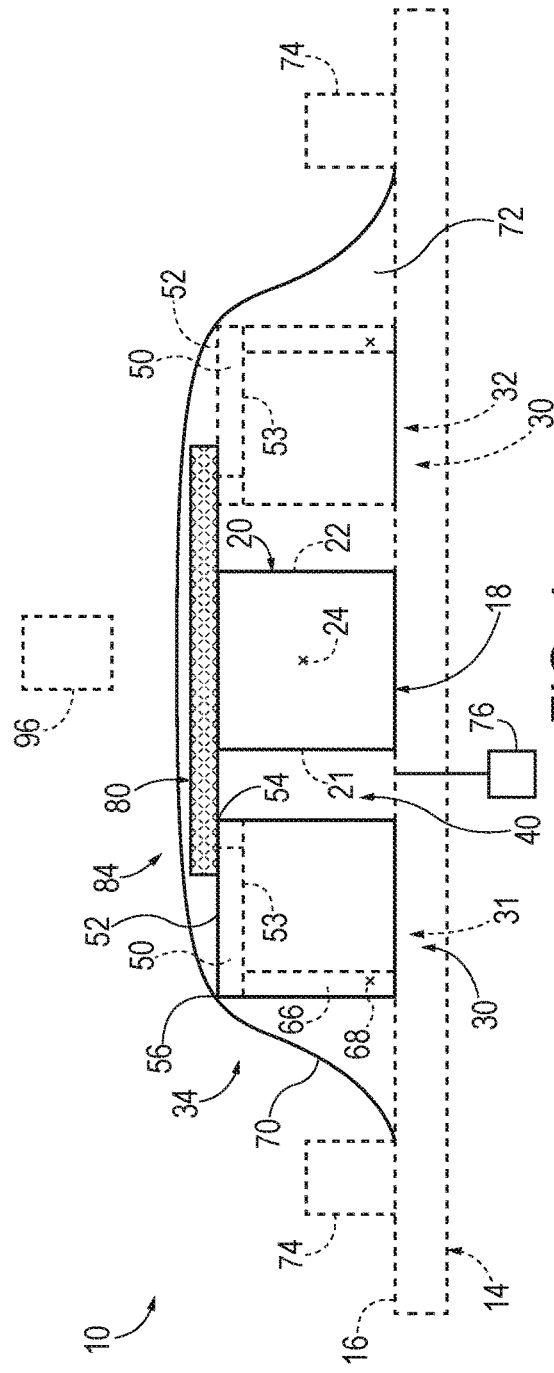
FIG. 4 is another schematic end view illustrating examples of the drape forming system of FIG. 3.
Figure 5:
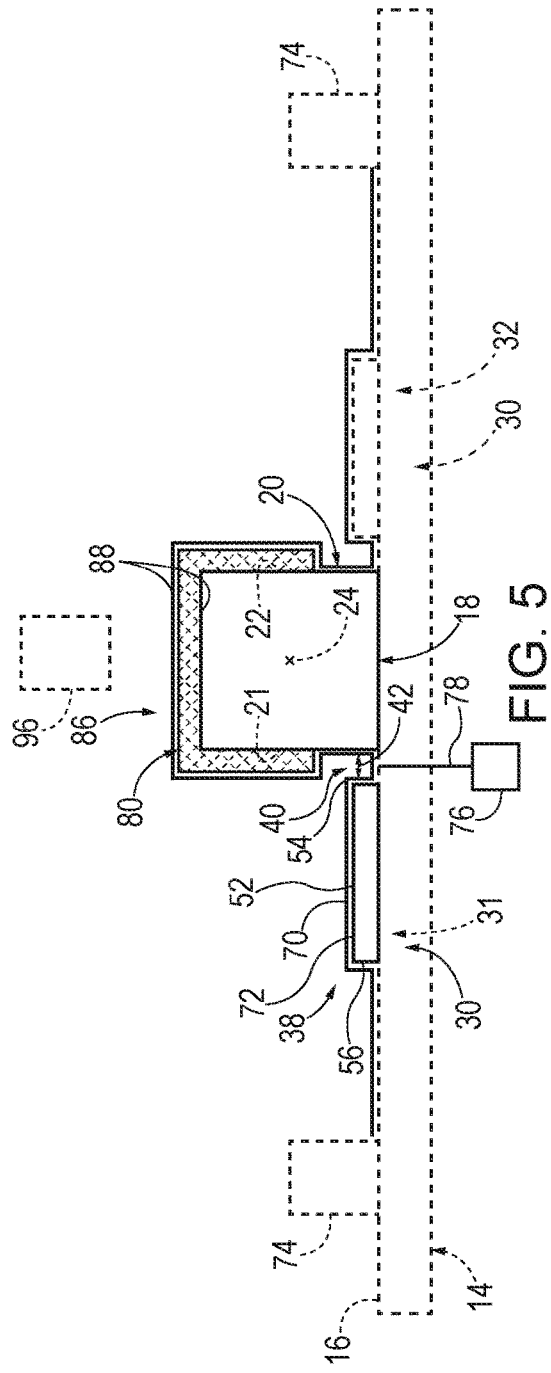
FIG. 5 is another schematic end view illustrating examples of the drape forming system of FIG. 3.
Figure 6:
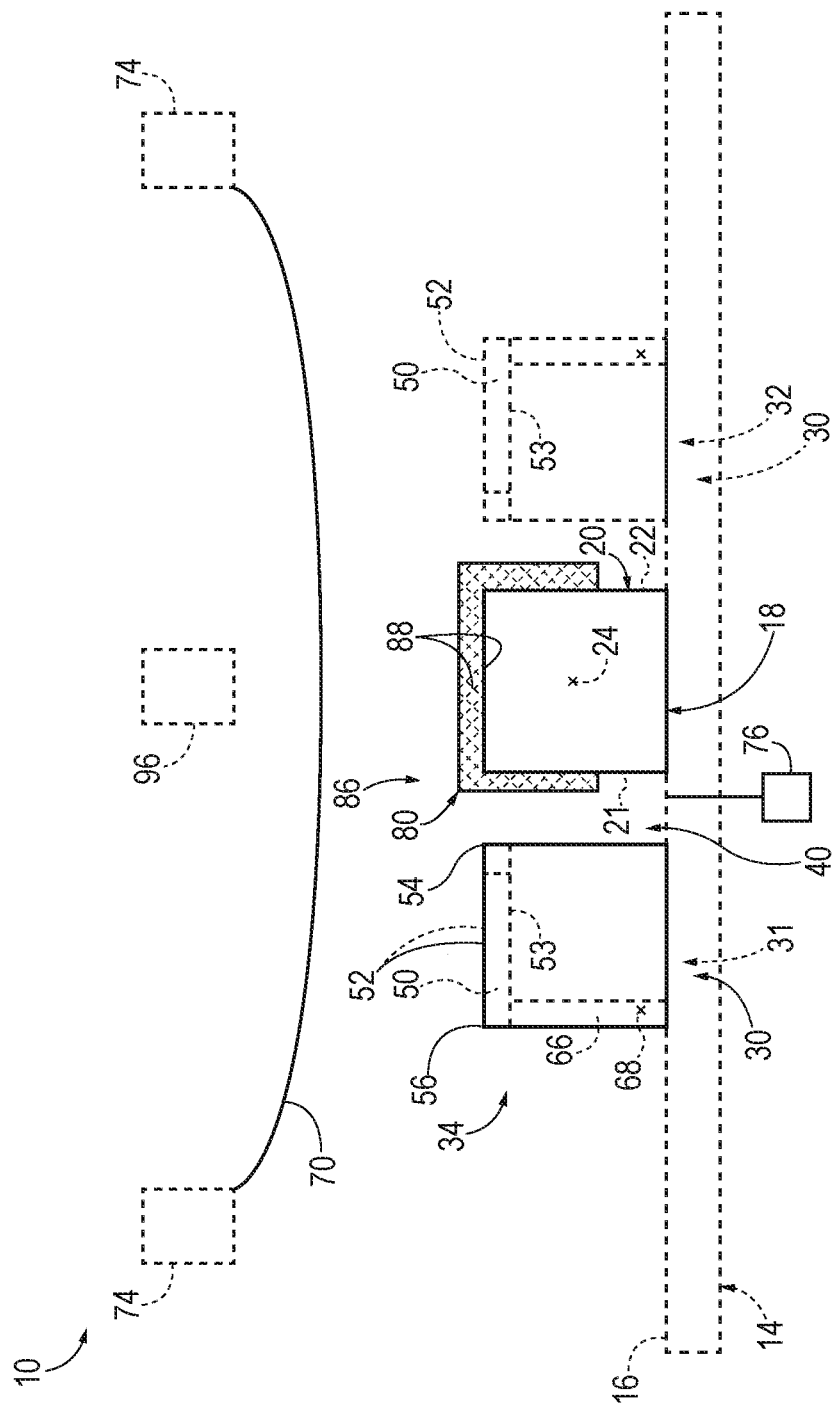
FIG. 6 is another schematic end view illustrating examples of the drape forming system of FIG. 3.
Figure 7:
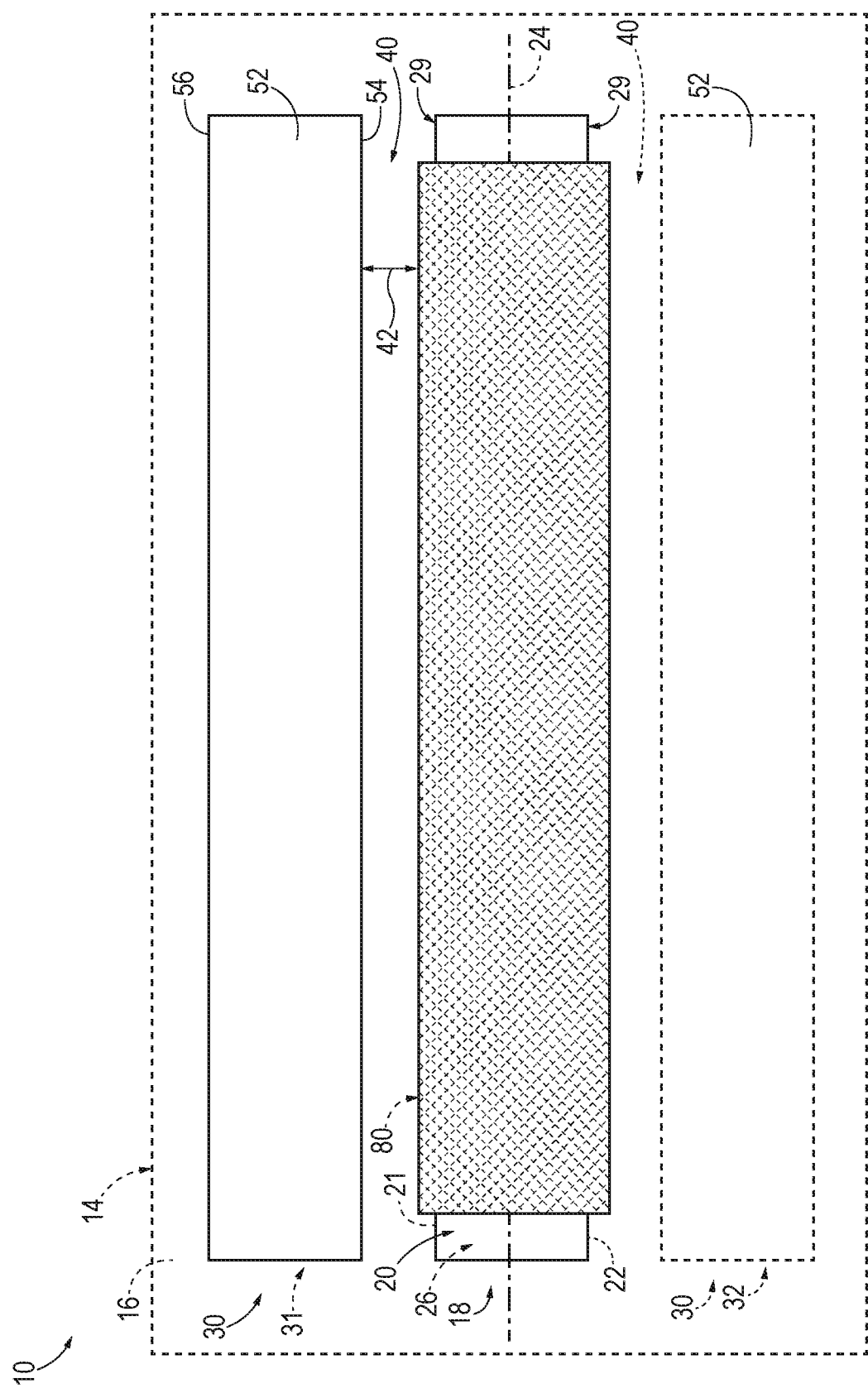
FIG. 7 is a schematic top view illustrating examples of the drape forming system of FIGS. 3-6.
Figure 8:
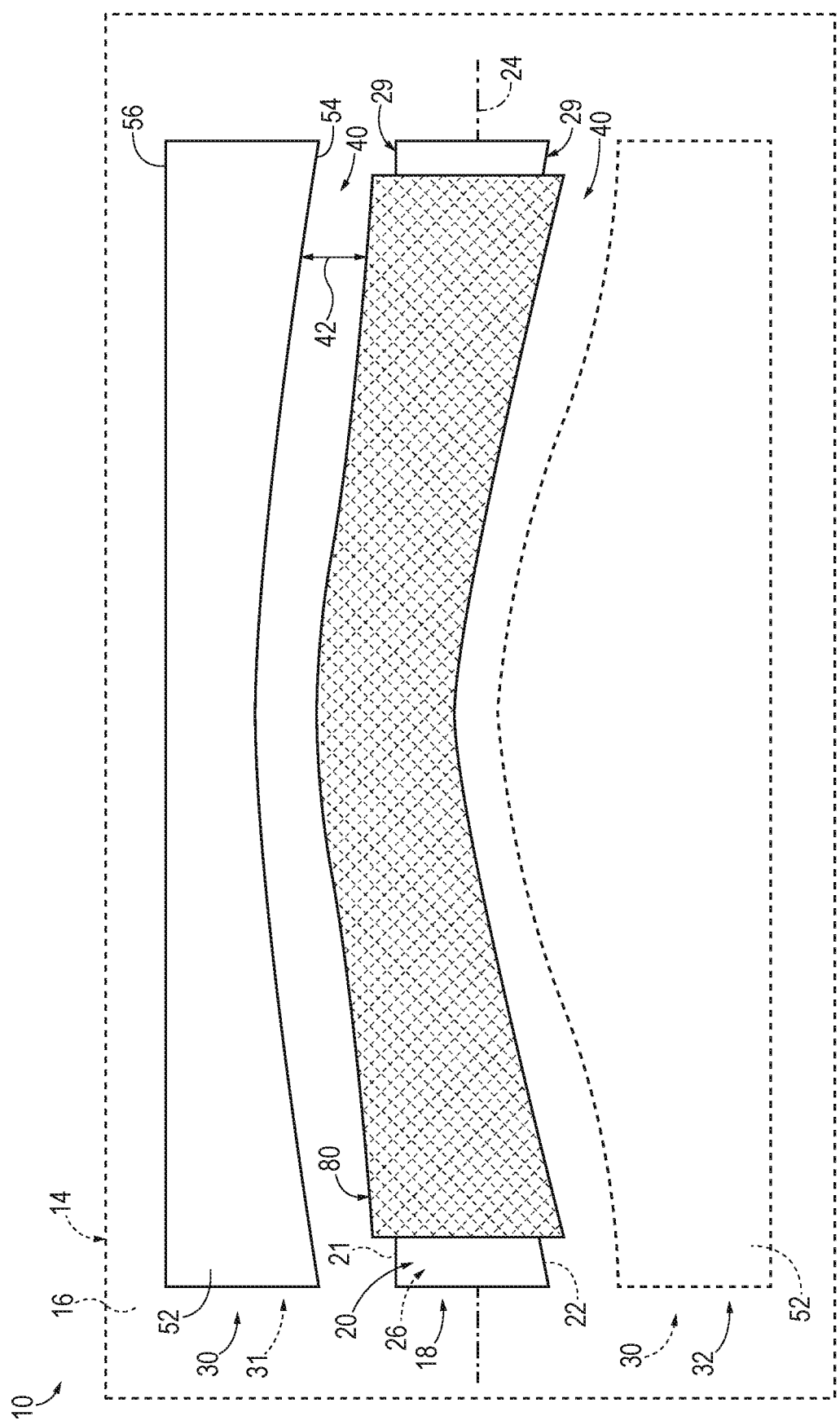
FIG. 8 is another schematic top view illustrating examples of the drape forming system of FIGS. 3-6.
Figure 11:
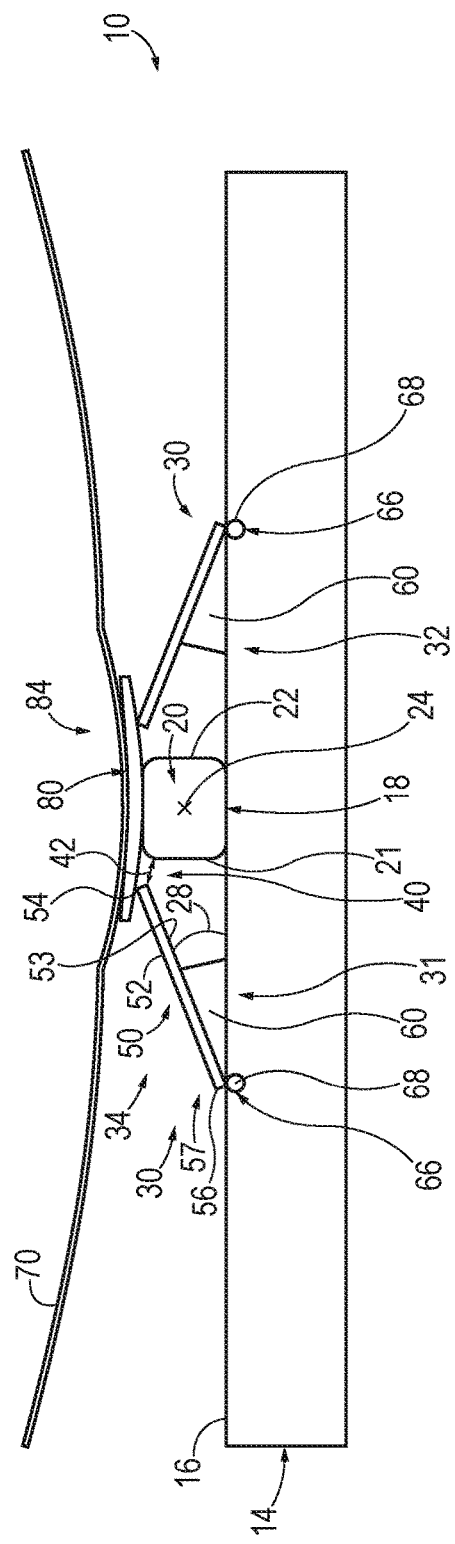
FIG. 11 is a less schematic side view illustrating an example of a drape forming system according to the present disclosure.
Figure 12:
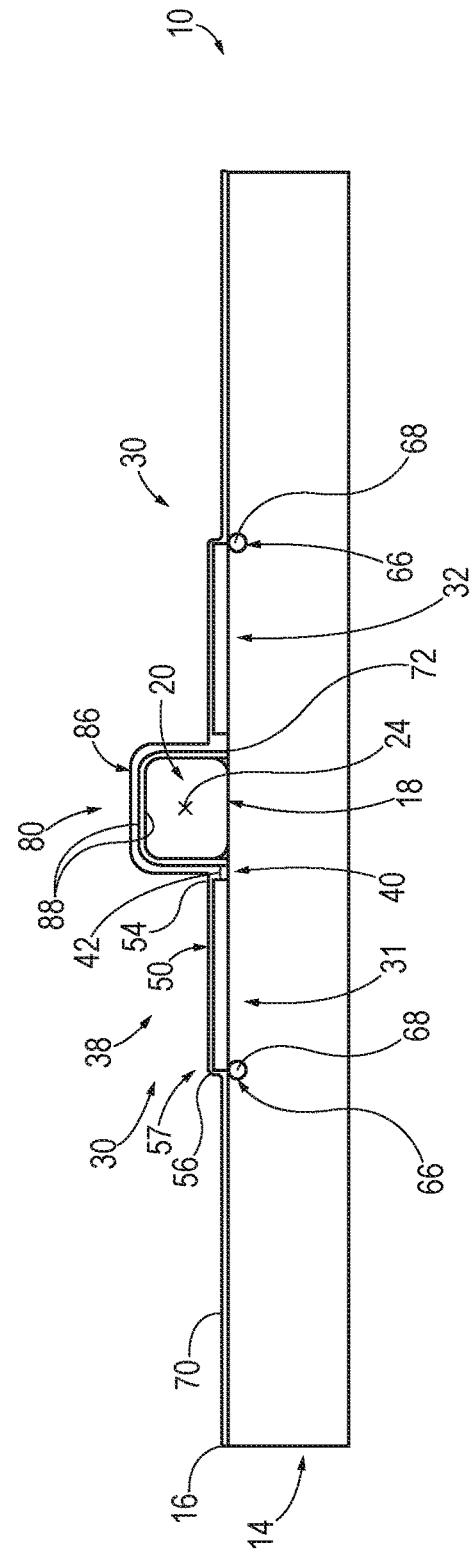
FIG. 12 is another less schematic side view illustrating examples of the drape forming system of FIG. 11.

FIGS. 3-6 are schematic end views illustrating examples of drape forming systems 10, according to the present disclosure, while FIGS. 7-8 are schematic top views illustrating examples of the drape forming systems 10 of FIGS. 3-6 or more specifically, schematic top views illustrating examples of drape forming systems 10 in the configuration illustrated in FIG. 6. Stated another way, and as illustrated in FIGS. 7-8, drape forming systems 10 and/or components thereof that are illustrated in FIGS. 3-6 may extend along an elongate axis 24, as illustrated in FIGS. 7-8. FIGS. 9-10 are less schematic side views illustrating an example of a drape forming system 10 according to the present disclosure, and FIGS. 11-12 are less schematic side views illustrating an example of another drape forming system 10 according to the present disclosure.

As illustrated generally by FIGS. 3-12, forming systems 10 include a forming die 18 that may have, include, and/or define a forming surface 20. Forming surface 20 may be configured to receive a composite charge 80 and/or may be shaped to at least partially define a desired surface contour 88 (as illustrated in FIGS. 5-6, 10, and 12) of composite charge 80. Forming system 10 also includes a collapsible support 30. Collapsible support 30 may have, include, and/or define a support surface 52. Support surface 52 may be adjacent and/or spaced-apart from forming surface 20 such that the support surface and the forming surface form, define, and/or bound a gap 40 therebetween.

Figure 3:
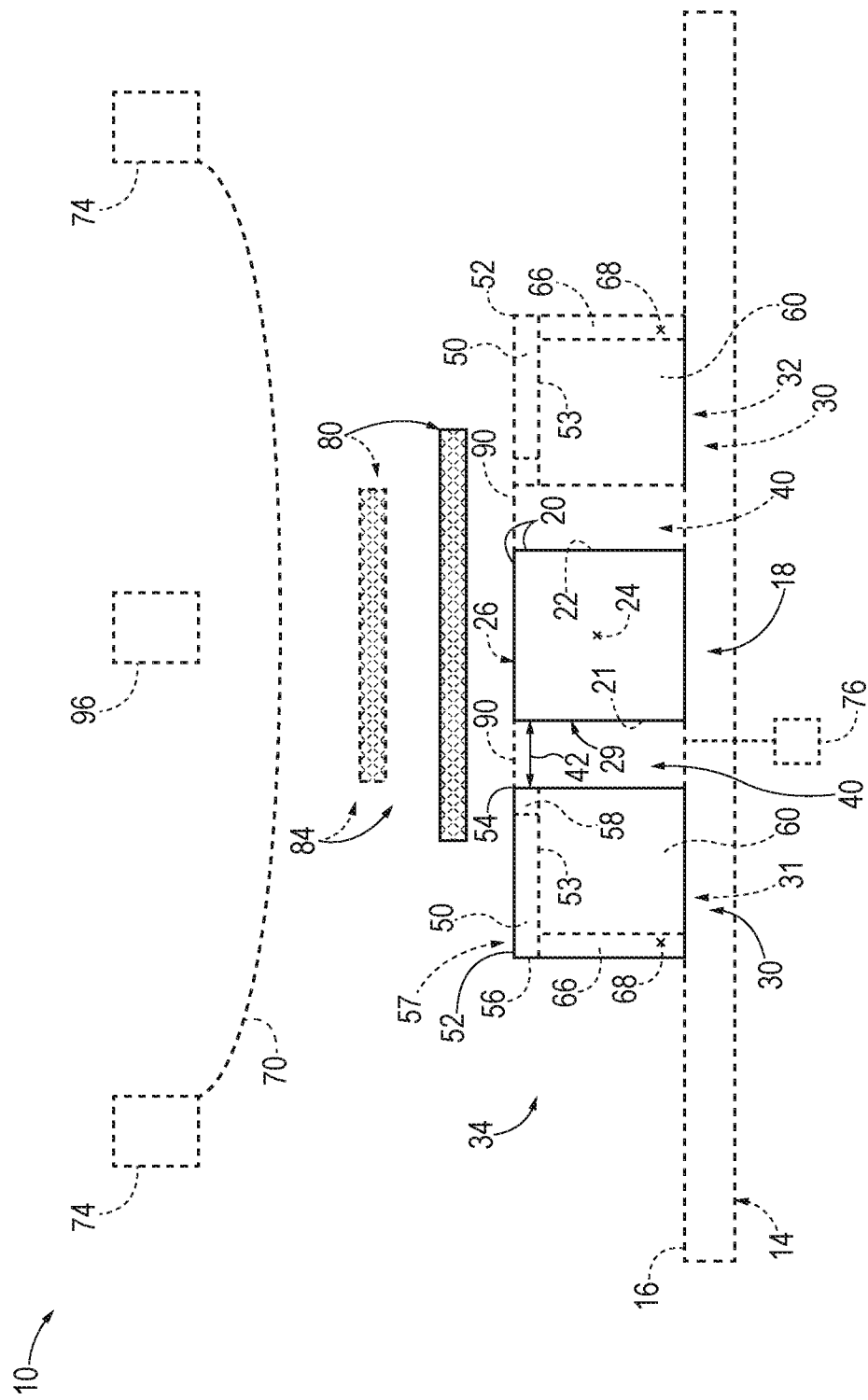
FIG. 3 is a schematic end view illustrating examples of a drape forming system according to the present disclosure.

As illustrated in dashed lines in FIG. 3 and in solid lines in FIGS. 4-6 and 9-12, forming system 10 may include a vacuum bag 70. As can be seen from a comparison of FIGS. 3 and 4, vacuum bag 70 may be moveable relative to forming die 18 and/or other components of forming system 10 to at least partially define and/or bound an enclosed volume 72, which is illustrated in FIGS. 4-5, 10, and 12. Enclosed volume 72 may contain forming surface 20 and/or support surface 52. Forming system 10 also includes a vacuum source 76, as illustrated in FIGS. 3-6. Vacuum source 76 may be configured to apply, or at selectively apply, a vacuum 78 to enclosed volume 72, such as to at least partially evacuate the enclosed volume, as illustrated in FIG. 5.

During operation of forming systems 10, and as discussed in more detail herein with reference to methods 200 of FIG. 14, composite charge 80 may be positioned on forming surface 20 of forming die 18. This is illustrated by the transition from the configuration illustrated in FIG. 3 to the configuration illustrated in FIG. 4, by FIG. 9, and by FIG. 11. As illustrated in FIGS. 3-4 and 11, a portion of composite charge 80 may extend from and/or past forming surface 20, may extend from and/or past a forming surface edge 29 of forming surface 20, and/or may extend into, or across, gap 40, such that the composite charge is at least partially and/or indirectly supported by both forming surface 20 and by support surface 52 of collapsible support 30. In examples in which a portion, or region, of composite charge 80 extends fully across gap 40, such as shown in FIGS. 3-4 and FIG. 11, support surface 52 directly supports, or may be referred to herein as directly supporting, the region of charge 80 that extends across the gap. In examples in which a portion of composite charge 80 extends into, but not fully across, gap 40, such as illustrated in dashed lines in FIG. 3 and in solid lines in FIG. 9, support surface 52 may indirectly support, or may be referred to herein as indirectly supporting, the portion of charge 80. In such examples, support surface 52 may support a suspension film 90, which in turn supports the region of the composite charge that extends past forming surface 20 and into the gap.

Subsequently, composite charge 80 may be deformed to conform a shape of the composite charge to that of forming surface 20. As an example, collapsible support 30 may retract and/or collapse, such as by transitioning from an extended conformation 34, as illustrated in FIGS. 3-4, 6, 9, and 11, to a collapsed conformation 38, as illustrated in FIGS. 5, 10, and 12. This retraction and/or collapse may cause composite charge 80 to transition from being at least partially, or at least indirectly, supported by collapsible support 30 to being unsupported by the collapsible support and/or to being fully supported by forming surface 20 and may be accomplished in any suitable manner. As examples, a gravitational force, heat, and/or an atmospheric pressure force may urge composite charge 80 toward forming surface 20 and/or may cause the composite charge to conform to the shape of the forming surface.

As a more specific example, and as illustrated by the aforementioned transition from the configuration shown in FIG. 3 to that in FIG. 4, vacuum bag 70 may be utilized to form, to define, and/or to at least partially bound enclosed volume 72. Stated another way, the vacuum bag may be positioned to define enclosed volume 72, which includes and/or contains forming surface 20 and/or support surface 52. Then, and as illustrated in FIG. 5, vacuum 78 may be applied to enclosed volume 72 by vacuum source 76. Stated another way, vacuum source 76 may be utilized to evacuate enclosed volume 72, such as via application of vacuum 78 to the enclosed volume.

Upon application of vacuum 78 to enclosed volume 72, collapsible support 30 may transition, may automatically transition, may passively transition, and/or may be configured to transition from an extended conformation 34, as illustrated in FIGS. 3-4, 6, 9, and 11, to a collapsed conformation 38, as illustrated in FIGS. 5, 10, and 12. Application of vacuum 78 also may cause an atmospheric pressure force to be applied to composite charge 80. The atmospheric pressure force may act upon composite charge 80, thereby deforming the composite charge, pressing the composite charge against forming surface 20, and/or causing the composite charge to transition from an initial conformation 84, as illustrated in FIGS. 3-4, 9, and 11, to a final conformation 86, as illustrated in FIGS. 5-6, 10, and 12. Stated another way, collapsible support 30 may be configured to transition from extended conformation 34 to collapsed conformation 38 responsive to and/or as a result of the atmospheric pressure force.

Upon transitioning to final conformation 86, composite charge 80 may form and/or define at least one desired surface contour 88 of a composite structure, such as composite structure 800 of FIGS. 1-2, that is at least partially defined by the composite charge. As discussed, desired surface contour 88 may be established by a shape and/or conformation of forming die 18.

Subsequently, the vacuum may be released. Upon release of the vacuum, collapsible support 30 may transition, may automatically transition, may passively transition, and/or may be configured to transition from collapsed conformation

38 to extended conformation 34, as illustrated by the transition from the configuration shown in FIG. 5 to that in FIG. 6. However, composite charge 80 may remain in final conformation 86 and/or still may define desired surface contour 88, as also illustrated in FIG. 6.

At least a portion of forming system 10 may be configured to be re-used and/or to be utilized to deform a plurality of distinct composite charges 80 from initial conformation 84 to final conformation 86. As an example, collapsible support 30 may be configured to transition, to automatically transition, and/or to passively transition between extended conformation 34 and collapsed conformation 38 a plurality of times without degradation of and/or without damage to the collapsible support. Stated another way, collapsible support 30 may be configured to repeatedly transition, or to be repeatedly transitioned, between extended conformation 34 and collapsed conformation 38, such as without degradation of and/or damage to the collapsible support.

Collapsible support 30 may be configured such that a gap width 42 of gap 40, or a minimum distance between forming surface 20 and support surface 52, decreases as the collapsible support transitions from extended conformation 34 to collapsed conformation 38. Stated another way, when collapsible support 30 is in extended conformation 34, gap 40 may have and/or define a first gap width, or a first average gap width. Similarly, when collapsible support 30 is in collapsed conformation 38, gap 40 may have and/or define a second gap width, or a second average gap width; and the second gap width may differ from, or may be less than, the first gap width. Stated yet another way, collapsible support 30 may be configured such that support surface 52, or at least a region of the support surface, moves toward forming die 18 as the collapsible support transitions from extended conformation 34 to collapsed conformation 38.

The decrease in gap width 42 as the collapsible support transitions from extended conformation 34 to collapsed conformation 38 may decrease a stress applied to and/or a strain within composite charge 80 and/or vacuum bag 70 during the transition. This decrease in stress and/or strain may in turn decrease a potential for degradation of and/or damage to composite charge 80 and/or vacuum bag 70 during the transition. In the example of composite charge 80, this decrease in stress and/or strain may permit and/or facilitate formation of fewer defects within the composite charge during drape forming thereof when compared to conventional drape forming processes. In the example of vacuum bag 70, this decrease in stress and/or strain may in turn decrease a potential for undesired air leaks and/or may permit and/or facilitate increased re-use of the vacuum bag when compared to conventional drape forming processes.

Collapsible support 30 may include any suitable structure that may be adapted, configured, designed, and/or constructed to form and/or define support surface 52 and/or to transition between extended conformation 34 and collapsed conformation 38. In some examples, collapsible support 30 may include and/or be an elongate collapsible support 30, such as may extend along a length, or along elongate axis 24, of forming surface 20, as perhaps best illustrated in FIGS. 7-8. Similarly, support surface 52 may include and/or be an elongate support surface 52, such as may extend along the length, or elongate axis 24, of forming surface 20.

Support surface 52 may include and/or may be defined by any suitable structure. In some examples, support surface 52 may include and/or be a planar, or an at least substantially planar, support surface 52. In some examples, a material that defines support surface 52 may be approved for contact with composite charge 80. Stated another way, the material that defines support surface 52 may be selected to not contaminate and/or damage composite charge 80 due to physical contact therewith.

In some examples, support surface 52 may be formed and/or defined by a support plate 50. In some examples, support plate 50, when present, may include and/or be a rigid, or an at least substantially rigid, support plate 50. Examples of support plate 50 include a metallic support plate, an aluminum support plate, a polymeric support plate, a fiberglass support plate, and/or a polycarbonate support plate. An additional example of support plate 50 includes a double-walled panel.

Collapsible support 30 may transition between extended conformation 34 and collapsed conformation 38 in any suitable manner. As an example, and as illustrated by the transition from the configuration shown in FIG. 4 to that in FIG. 5, by the transition from the configuration shown in FIG. 9 to that in FIG. 10, and/or by the transition from the configuration shown in FIG. 11 to that in FIG. 12, a height, or a vertical height, of collapsible support 30 may decrease as the collapsible support transitions from extended conformation 34 to collapsed conformation 38. As another example, a die-proximate support surface edge 54 of support surface 52 may translate, rotate, pivot, and/or hinge at least partially toward forming die 18 and/or forming surface 20 thereof as collapsible support 30 transitions from extended conformation 34 to collapsed conformation 38.

As discussed, collapsible support 30 may be configured to repeatedly transition between extended conformation 34 and collapsed conformation 38 and/or this transition may be responsive to and/or a result of evacuation of enclosed volume 72 utilizing vacuum source 76. In some examples, collapsible support 30 may include a biasing mechanism 60, as illustrated in FIGS. 3, 9, and 11, that may, or that may be configured to, urge support surface 52 toward extended conformation 34. Examples of biasing mechanism 60 include a foam, a spring, and/or an actuator. Examples of the foam include open-celled foam and/or closed-cell foam. Examples of the spring include a coil spring, a leaf spring, and/or a torsion spring. Examples of the actuator include an electrically actuated actuator, a mechanically actuated actuator, a hydraulically actuated actuator, a linear actuator, and/or a rotary actuator.

In some examples, biasing mechanism 60 may be configured to passively permit and/or facilitate the transition between extended conformation 34 and collapsed conformation 38. As an example, the biasing mechanism may produce and/or generate a bias force that may be less than the atmospheric pressure force exerted on collapsible support 30 and/or on support surface 52 thereof upon evacuation of enclosed volume 72. As such, evacuation of the enclosed volume may cause collapsible support 30 to passively transition from extended conformation 34 to collapsed conformation 38. Similarly, filling enclosed volume 72 with air may cause collapsible support 30 to passively transition from collapsed conformation 38 to extended conformation 34. In some such examples, a rigidity of biasing mechanism 60 may be selected to permit and/or facilitate a desired rate and/or amount of motion of support surface 52 as collapsible support 30 transitions between extended conformation 34 and collapsed conformation 38.

In some examples, biasing mechanism 60 may be configured to actively permit and/or facilitate the transition between extended conformation 34 and collapsed conformation 38. As an example, actuation of the actuator, such as via any suitable mechanical, electrical, and/or hydraulic mechanism, may cause the transition between extended conformation 34 and collapsed conformation 38.

As illustrated in dashed lines in FIG. 3, collapsible support 30 may include an edge protection structure 58. Edge protection structure 58, when present, may be positioned along, or may define, die-proximate support surface edge 54 and/or may be configured to decrease a potential for damage to composite charge 80, vacuum bag 70, and/or suspension film 90, such as during the transition between extended conformation 34 and collapsed conformation 38. Examples of edge protection structure 58 include a rounded edge shape, a padded material, a resilient material, and/or a flexible material.

In some examples, collapsible support 30 may include an at least substantially rigid support plate 50 that may form and/or define support surface 52. Support plate 50 may define die-proximate support surface edge 54 and a die-distal support surface edge 56, and support surface 52 may extend between die-proximate support surface edge 54 and die-distal support surface edge 56.

In some such examples, collapsible support 30 also may include a hinge mechanism 66 that defines a hinge axis 68. Hinge axis 68 may extend parallel, or at least substantially parallel, to elongate axis 24 of forming surface 20. Hinge mechanism 66 may be operatively attached to support plate 50 such that the support plate rotates about hinge axis 68 as collapsible support 30 transitions between extended conformation 34 and collapsed conformation 38, as perhaps best illustrated by the transition from the configuration shown in FIG. 9 to that in FIG. 10 or by the transition from the configuration shown in FIG. 11 to that in FIG. 12. In some examples, hinge mechanism 66 may be operatively attached to a die-distal support surface edge region 57 of support plate 50.

In some such examples, collapsible support 30 also may include biasing mechanism 60, such as a foam body. Biasing mechanism 60 may be configured to urge support surface 52 toward extended conformation 34. In some examples, biasing mechanism 60 may be positioned proximate die-distal support surface edge region 57 and/or on a charge-opposed side 53 of support plate 50.

In some such examples, when collapsible support 30 is in extended conformation 34, and as perhaps best illustrated in FIGS. 9 and 11, support surface 52 may be orientated at a skew angle 28 relative to an upper region 26, or an upper surface, of forming surface 20 and/or relative to a base surface 16 of a base structure 14 that supports forming die 18 and/or collapsible support 30. Additionally or alternatively, when collapsible support 30 is in collapsed conformation 38 and as perhaps best illustrated in FIGS. 10 and 12, support surface 52 may be oriented parallel, or at least substantially parallel, to upper region 26, or the upper surface, of forming surface 20 and/or to base surface 16. Stated another way, support surface 52 may rotate by skew angle 28 upon transitioning between the extended conformation 34 and collapsed conformation 38. Examples of skew angle 28 include angles of at least 10 degrees, at least 15 degrees, at least 20 degrees, at least 25 degrees, at least 30 degrees, at least 35 degrees, at least 40 degrees, at least 45 degrees, at most 80 degrees, at most 75 degrees, at most 70 degrees, at most 65 degrees, at most 60 degrees, at most 55 degrees, at most 50 degrees, and/or at most 45 degrees.

As illustrated in solid and dashed lines in FIGS. 3-8 and in solid lines in FIGS. 9-12, forming systems 10 may include a plurality of collapsible supports 30. As an example, collapsible support 30 may include a first collapsible support 31 and a second collapsible support 32. First collapsible support 31 may be positioned adjacent and/or along a first side 21 of forming surface 20 and second collapsible support 32 may be positioned adjacent and/or along a second side 22 of forming surface 20. In some such examples, first side 21 and second side 22 may be opposed sides of forming surface 20. In some such examples, a distance between a first charge-proximate support surface edge of first collapsible support 31 and a second charge-proximate support surface edge of second collapsible support 32 may decrease as the first collapsible support and the second collapsible support transition from corresponding extended conformations to corresponding collapsed conformations. Stated another way, the first charge-proximate support surface edge and/or the second charge-proximate support surface edge may move toward forming die 18 and/or forming surface 20 thereof as the first collapsible support and the second collapsible support transition from corresponding extended conformations to corresponding collapsed conformations.

Additionally or alternatively, forming die 18 may define an external periphery, and collapsible support 30, or the plurality of collapsible supports 30, may extend around at least a threshold fraction of the external periphery of the forming die. Examples of the threshold fraction of the external periphery include threshold fractions of at least 50%, at least 60%, at least 70%, at least 80%, at least 90%, at least 95%, at least 99%, and/or 100%. The external periphery may be defined within a plane, such as a plane of base surface 16 and/or of upper region 26 of forming die 20.

As discussed, forming system 10 may include base structure 14, which may define base surface 16. As also discussed, forming die 18 and/or collapsible support 30 may be supported by base structure 14 and/or may be positioned on base surface 16. Biasing mechanism 60 and/or hinge mechanism 66 also may be positioned on base surface 16 and/or may be operatively attached to base structure 14, when present. Base surface 16 may at least partially define and/or bound enclosed volume 72.

As also discussed, and as illustrated in FIGS. 3 and 9, forming system 10 may include suspension film 90. Suspension film 90, when present, may extend from forming surface 20 of forming die 18, may extend across gap 40, and/or may extend to support surface 52 of collapsible support 30. Suspension film 90, when present, may be configured to support a region of composite charge 80 that extends past forming surface 20, as perhaps best illustrated in FIGS. 3 and 9. Suspension film 90, when present, may be configured to sever and/or tear as the collapsible support transitions from extended conformation 34 to collapsed conformation 38. This severing and/or tearing of suspension film 90 may permit and/or facilitate return of collapsible support 30 to extended conformation 34 from collapsed conformation 38, as illustrated in FIG. 6, without deformation of composite charge 80 that may otherwise be experienced due to a return of suspension film 90 to the extended conformation that is illustrated in FIGS. 3 and 9.

Suspension film 90 may include any suitable structure and/or material that may operatively support at least a region and/or portion of composite charge 80, that may not contaminate the composite charge, and/or that may sever as collapsible support 30 transitions from extended conformation 34 to collapsed conformation 38. Examples of suspension film 90 include a low surface energy polymeric suspension film, a resilient suspension film, a flexible suspension film, and/or a fluorinated ethylene propylene polymer suspension film.

As illustrated in dashed lines in FIGS. 3-6, forming system 10 may include a bag frame 74, which also may be referred to herein as a bag support frame 74. Bag frame 74, when present, may extend around an external periphery of vacuum bag 70, may be operatively attached to the external periphery of the vacuum bag, and/or may be configured to facilitate positioning of the vacuum bag relative to forming die 18, such as to form and/or define enclosed volume 72.

As also illustrated in dashed lines in FIGS. 3-6, forming system 10 may include a heater 96. Heater 96, when present, may be configured to heat composite charge 80 when the composite charge is drape formed with, via, and/or utilizing forming system 10. Examples of heater 96 include an infrared heater, a radiant heater, and/or at heat lamp.

As shown in the drawings, composite charge 80, when used with forming system 10, may be positioned within enclosed volume 72 and/or may be supported by at least a region of forming surface 20, as perhaps best illustrated in FIGS. 4-5, 10, and 12. In some examples, and as discussed, collapsible support 30 may be in extended conformation 34 and a region of composite charge 80 may be supported by support surface 52, as perhaps best illustrated in FIGS. 4 and 11. In some examples, collapsible support 30 may be in collapsed conformation 38 and composite charge 80 may be spaced-apart from support surface 52 and/or may be entirely supported by forming surface 20, as perhaps best illustrated in FIGS. 4, 10, and 12.

Composite charge 80 may include and/or be any suitable structure and/or structures. As an example, composite charge 80 may include and/or be a layered charge of composite material. As another example, composite charge 80 may include a plurality of layers and/or plies of composite material. As additional examples, composite charge 80 may include a resin-free dry pre-form, fiberglass, fiberglass cloth, carbon fiber, carbon fiber cloth, a cloth, a resin, and/or a pre-impregnated composite material.

Forming die 18 may include and/or be any suitable structure that may define forming surface 20 and/or that may be configured to form and/or define desired surface contour 88 in and/or within composite charge 80. As an example, forming die 18 may include and/or be a layup mandrel. In some examples, and as perhaps best illustrated in FIGS. 7-8, forming die 18 may include and/or be an elongate forming die 18 that may define an elongate forming surface 20.

Vacuum bag 70 may include any suitable structure that may at least partially form, define, and/or bound enclosed volume 72, that may be configured to permit and/or facilitate application of the atmospheric pressure force to collapsible support 30 and/or to composite charge 80 upon evacuation of the enclosed volume, that may contact composite charge 80 without damage to and/or contamination of the composite charge, and/or that may be configured to deform, or to repeatedly deform, during one or more evacuations of enclosed volume 72. Examples of vacuum bag 70 include an air-impermeable material, an air-impervious material, a film, a polymeric film, an elastomeric film, a stretchable film, flexible film, a sheet, a polymeric sheet, an elastomeric sheet, a stretchable sheet, and/or a flexible sheet. Examples of materials from which vacuum bag 70 may be formed include a rubber, silicone rubber, and/or Mosites™.

Vacuum source 76 may include any suitable structure that may be adapted, configured, designed, and/or constructed to apply, or to selectively apply, vacuum 78 to enclosed volume 72. Examples of vacuum source 76 include a vacuum pump and/or a blower.

As discussed, FIGS. 3-6 and 9-12 are schematic side views illustrating examples of drape forming systems 10, while FIGS. 7-8 provide schematic top views of drape forming systems 10. As also discussed, forming die 18 may include and/or be an elongate forming die 18, forming surface 20 may include and/or be an elongate forming surface 20, collapsible support 30 may include and/or be an elongate collapsible support 30, and/or support surface 52 may include and/or be an elongate support surface 52. Such elongate structures are perhaps best illustrated in the schematic top views of FIGS. 7-8.

With the above in mind, and as perhaps also best illustrated in FIGS. 7-8, gap 40 may include and/or be an elongate gap 40 that may extend along elongate axis 24 of forming surface 20 and/or that may extend between elongate forming surface 20 and elongate support surface 52. Gap width 42 may be defined as a minimum distance between die-proximate support surface edge 54 and forming surface 20. Additionally or alternatively, gap width 42 may be defined as an average of the minimum distance between die-proximate support surface edge 54 and forming surface 20 as taken along elongate axis 24 of forming surface 20. With this in mind, the first average gap width may be defined as the minimum distance, or as the average of the minimum distance, when collapsible support 30 is in extended conformation 34, and the second average gap width may be defines as the minimum distance, or as the average of the minimum distance, when collapsible support 30 is in collapsed conformation 38.

Forming surface 20 may have, or may be referred to herein as having, forming surface edge 29 that bounds, or that at least partially bounds, gap 40. Similarly, and as discussed, support surface 52 may have, or may be referred herein as having, die-proximate support surface edge 54 that bounds, or that at least partially bounds, gap 40. Forming surface edge 29 also may be referred to herein as a forming surface edge region 29, a forming surface side 29, and/or a region of forming surface 20 that is proximate, or closest to, support surface 52; and it is within the scope of the present disclosure that a location of forming surface edge 29 on forming surface 20 may change and/or vary as collapsible support 30 transitions between extended conformation 34 and collapsed conformation 38. Die-proximate support surface edge 54 also may be referred to herein as a die-proximate support surface edge region 54, a support surface corner 54, and/or a region of support surface 52 that is proximate, or closes to, forming surface 20.

As illustrated in FIGS. 7-8, die-proximate support surface edge 54 may extend along a length of support surface 52 and/or forming surface edge 29 may extend along a length of forming surface 20. As also illustrated in FIGS. 7-8, a shape of die-proximate support surface edge 54 may correspond to, may mirror, may parallel, and/or may follow a shape of forming surface edge 29. Additionally or alternatively, and as also illustrated in FIGS. 7-8, gap width 42 of gap 40 may be constant, or at least substantially constant, along the gap, along a length of the gap, along forming surface edge 29, along die-proximate support surface edge 54, and/or between the forming surface edge and the die-proximate support surface edge. This constant, or at least substantially constant, gap width along the length of the gap may be maintained as collapsible support 30 transitions between extended conformation 34 and collapsed conformation 38 and/or as the gap width changes during this transition. However, it is to be understood that small variations in the gap width along the length of the gap may occur. These variations in the gap width along the length of the gap may be less than 1%, less than 5%, less than 10%, less than 15%, and/or less than 20%.

In some examples, and as illustrated in FIG. 7, forming surface edge 29, or at least a region of the forming surface edge, may have, exhibit, and/or define a linear, or an at least substantially linear, forming surface edge shape. Similarly, and as also illustrated in FIG. 7, die-proximate support surface edge 54, or at least a region of the die-proximate support surface edge, may have, exhibit, and/or define a linear, or an at least substantially linear, die-proximate support surface edge shape. In such examples, forming surface edge 29 and die-proximate support surface edge 54 may extend parallel to one another; and gap 40 may be referred to herein as being a linear gap.

In some examples, and as illustrated in FIG. 8, forming surface edge 29, or at least a region of the forming surface edge, may have, exhibit, and/or define a nonlinear, an arcuate, and/or a curved forming surface edge shape. Similarly, and as also illustrated in FIG. 8, die-proximate support surface edge 54, or at least a region of the die-proximate support surface edge, may have, exhibit, and/or define a nonlinear, an arcuate, and/or a curved die-proximate support surface edge shape. In such examples, forming surface edge 29 and die-proximate support surface edge 54 may follow corresponding, similar, or even identical trajectories along the length of gap 40; and the gap also may be referred to herein as being a nonlinear gap and/or as being an arcuate gap.

Figure 13:
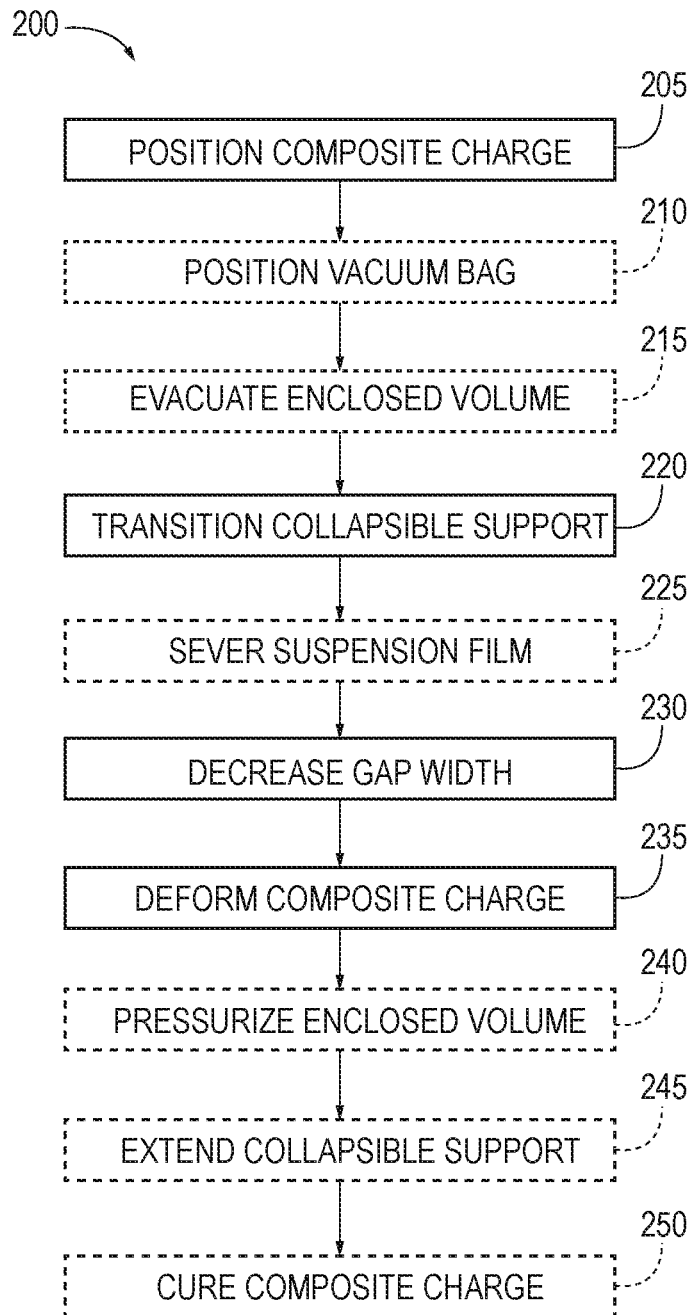
FIG. 13 is a flowchart depicting examples of methods of drape forming a composite charge, according to the present disclosure.

FIG. 13 is a flowchart depicting examples of methods 200 of drape forming a composite charge, according to the present disclosure. Methods 200 may be performed with, via, and/or utilizing a forming system, such as forming system 10 of FIGS. 3-12. Methods 200 include positioning the composite charge at 205 and may include positioning a vacuum bag at 210. Methods 200 also may include evacuating an enclosed volume at 215 and include transitioning a collapsible support at 220. Methods 200 may include severing a suspension film at 225 and include decreasing a gap width at 230 and deforming the composite charge at 235. Methods 200 further may include pressurizing the enclosed volume at 240, extending the collapsible support at 245, and/or curing the composite charge at 250.

Positioning the composite charge at 205 may include positioning within a forming system. The positioning at 205 may include positioning the composite charge such that a first region of the composite charge is supported by a forming surface of a forming die. The positioning at 205 additionally or alternatively may include positioning the composite charge such that a second region of the composite charge is at least indirectly supported by a support surface of a collapsible support. The support surface and the forming surface may define a gap therebetween. Examples of the composite charge, the forming surface, the forming die, the support surface, and the collapsible support are disclosed herein with reference to composite charge 80, forming surface 20, forming die 18, support surface 52, and collapsible support 30, respectively. The positioning at 205 is illustrated in FIG. 3, where composite charge 80 is in the process of being positioned on forming surface 20 such that the composite charge is supported by the forming surface and is also directly supported by support surface 52 of collapsible support 30, as illustrated in solid lines, or indirectly supported by the support surface via suspension film 90, as illustrated in dashed lines.

Positioning the vacuum bag at 210 may include positioning such that the vacuum bag defines, bounds, at least partially defines, and/or at least partially bounds an enclosed volume. The enclosed volume may include, contain, and/or be bounded by the composite charge, the forming surface, and/or the support surface. Examples of the vacuum bag and the enclosed volume are disclosed herein with reference to vacuum bag 70 and enclosed volume 72, respectively. The positioning at 210 is illustrated in FIG. 4, with vacuum bag 70 at least partially defining enclosed volume 72 that contains, houses, and/or is at least partially bounded by composite charge 80, forming surface 20, and/or support surface 52.

The positioning at 210 may be performed with any suitable timing and/or sequence during methods 200. As examples, the positioning at 210 may be performed subsequent to the positioning at 205 and/or prior to the evacuating at 215.

Evacuating the enclosed volume at 215 may include evacuating the enclosed volume with, via, and/or utilizing a vacuum source. This may include applying a vacuum to the enclosed volume with the vacuum source. The evacuating at 215 may include applying an atmospheric pressure force to the collapsible support, to the composite charge and/or to the forming die. Examples of the vacuum source are disclosed herein with reference to vacuum source 76 of FIGS. 3-6. The evacuating at 215 is illustrated by the transition from the configuration shown in FIG. 4 to that in FIG. 5.

The evacuating at 215 may be performed with any suitable timing and/or sequence during methods 200. As examples, the evacuating at 215 may be performed subsequent to the positioning at 205, subsequent to the positioning at 210, at least partially concurrently with the transitioning at 220, at least partially concurrently with the severing at 225, at least partially concurrently with the decreasing at 230, at least partially concurrently with the deforming at 235, prior to the pressurizing at 240, prior to the extending at 245, and/or prior to the curing at 250.

In some examples of methods 200, methods 200 also may include heating the composite charge. The heating may include heating to soften the composite charge and/or to facilitate the deforming at 235 and may be performed prior to and/or during the evacuating at 215 and/or the deforming at 235.

Transitioning the collapsible support at 220 may include transitioning the collapsible support from an extended conformation to a collapsed conformation and may be performed during and/or responsive to the evacuating at 215. This may include decreasing a height and/or an enclosed volume of the collapsible support and/or moving the support surface along the forming surface and/or along a forming surface edge of the forming surface. Additionally or alternatively, the transitioning at 220 may include moving the support surface toward a base surface of a base structure that supports the collapsible support and/or the forming die. The transitioning at 220 is illustrated by the transition from extended conformation 34 of FIGS. 4, 9, and 11 to collapsed conformation 38 of FIGS. 5, 10, and 12.

In some examples, the collapsible support may include a biasing mechanism that may bias the collapsible support and/or the forming surface toward the extended conformation. In such examples, methods 200 may include resisting the transitioning at 220 with the biasing mechanism. Additionally or alternatively, the transitioning at 220 may include applying the pressure force to overcome the biasing mechanism and transition the collapsible support from the extended conformation to the collapsed conformation. Examples of the biasing mechanism are disclosed herein with reference to biasing mechanism 60.

In some examples, the forming system may include a suspension film, which may span the gap and/or may extend between the forming surface and the support surface. In such examples, and as discussed, the positioning at 205 may include positioning such that at least a portion of the second region of the composite charge is supported by the suspension film. In some such examples, methods 200 further may include severing the suspension film at 225. The severing at 225 may be performed during and/or responsive to the evacuating at 215. As discussed in more detail herein, the severing at 225 may permit and/or facilitate return of the collapsible support to the extended conformation without undesired concurrent deformation of the composite charge. Examples of the suspension film are disclosed herein with reference to suspension film 90.

The severing at 225 may be accomplished in any suitable manner. As an example, the transitioning at 220 may stretch the suspension film, thereby generating strain within the suspension film, and the severing at 225 may be responsive to generation of greater than a threshold amount of strain within the suspension film. As another example, the suspension film may include holes and/or imperfections configured to generate failure, or severing, of the suspension film during the transitioning at 220 and/or responsive to the strain generated within the suspension film during the transitioning at 220.

Decreasing the gap width at 230 may include decreasing the gap width as the collapsible support transitions from the extended conformation to the collapsed conformation and may be performed during and/or responsive to the evacuating at 215. This may include systematically, progressively, and/or monotonically decreasing the gap width during the evacuating at 215 and/or as a result of the transitioning at 220.

The decreasing at 230 may be accomplished in any suitable manner. As examples, the decreasing at 230 may include translating the support surface at least partially toward the forming die, rotating the support surface at least partially toward the forming die, pivoting the support surface at least partially toward the forming die, and/or hinging the support surface at least partially toward the forming die.

In a specific example, the collapsible support may include a support plate, which may define the support surface, and a hinge mechanism, which may define a hinge axis. The hinge mechanism may be configured to permit and/or facilitate rotation of the support plate and/or of the support surface thereof about the hinge axis as the collapsible support transitions from the extended conformation to the collapsed conformation. Examples of the hinge mechanism, the hinge axis, and the support plate are disclosed herein with reference to hinge mechanism 66, hinge axis 68, and support plate 50, respectively. The decreasing at 230 is illustrated by the decrease in gap width 42 as illustrated by the transition from the configuration shown in FIG. 4 to that in FIG. 5, by the transition from the configuration shown in FIG. 9 to that in FIG. 10, and/or by the transition from the configuration shown in FIG. 11 to that in FIG. 12.

Deforming the composite charge at 235 may include deforming the composite charge from an initial conformation to a final conformation and may be performed during, at least partially responsive to, and/or responsive to the evacuating at 215. Additionally or alternatively, the deforming at 235 may be performed during, at least partially responsive to, and/or responsive to the transitioning at 220. The final conformation may define a desired surface contour, such as for a composite part that is at least partially defined by the composite charge. The deforming is illustrated by the transition from the configuration shown in FIGS. 4, 9, and 11, which illustrate composite charge 80 in an initial conformation 84, to that in FIGS. 5, 10, and 12, respectively, which illustrate composite charge 80 in final conformation 86.

Pressurizing the enclosed volume at 240 may include pressurizing the enclosed volume to atmospheric pressure and may be performed subsequent to the evacuating at 215. This may include flowing a gas, such as air, into the enclosed volume to decrease, or to eliminate, the atmospheric pressure force applied during the evacuating at 215; and methods 200 may include maintaining the composite charge in the final conformation during and/or subsequent to the pressurizing at 240. The pressurizing at 240 is illustrated by the transition from the configuration shown in FIG. 5, in which enclosed volume 72 has been evacuated by vacuum source 76, to that in FIG. 6, in which the enclosed volume has been pressurized to atmospheric pressure and vacuum bag 70 no longer defines the enclosed volume and/or has been separated from a remainder of forming system 10.

Extending the collapsible support at 245 may include extending the collapsible support from the collapsed conformation and/or to the extended conformation and may be performed during and/or responsive to the pressurizing at 240. The extending at 245 is illustrated by the transition from the configuration shown in FIG. 5, in which collapsible support 30 is in collapsed conformation 38, to that in FIG. 6, in which the collapsible support has transitioned to extended conformation 34.

Curing the composite charge at 250 may include curing the composite charge to at least partially form and/or define a composite structure, such as composite structure 800 of FIGS. 1-2. This may include curing the composite charge to produce and/or generate a cured composite charge, which may be stronger and/or more rigid when compared to a strength and/or rigidity of the composite charge prior to the curing at 250.

Illustrative, non-exclusive examples of inventive subject matter according to the present disclosure are described in the following enumerated paragraphs:

A1. A forming system for drape forming a composite charge, the forming system comprising:

a forming die having a forming surface and optionally at least one of:

(i) the forming surface is shaped to at least partially define a desired surface contour of the composite charge;

(ii) the forming surface is configured to receive the composite charge; and (iii) the forming surface having a forming surface edge; and a collapsible support having a support surface, optionally wherein the support surface is adjacent, or spaced-apart from, the forming surface such that the support surface and the forming surface define a gap therebetween, optionally wherein the gap has a gap width, and further optionally wherein the support surface has a support surface edge;

optionally a vacuum bag that at least partially defines an enclosed volume that contains the forming surface and the support surface; and optionally a vacuum source configured to selectively apply a vacuum to the enclosed volume;

wherein, optionally upon application of the vacuum to the enclosed volume by the vacuum source, the collapsible support is configured to transition between, or from, an extended conformation to a collapsed conformation; and wherein at least one of:

(i) the collapsible support is configured such that the gap width of the gap decreases as the collapsible support transitions from the extended conformation to the collapsed conformation;

(ii) when the collapsible support is in the extended conformation, the gap has a first average gap width, and further wherein, when the collapsible support is in the collapsed conformation, the gap has a second average gap width that is less than the first average gap width;

(iii) the collapsible support is configured such that the support surface moves toward the forming die as the collapsible support transitions from the extended conformation to the collapsed conformation;

(iv) in the extended conformation, the support surface is configured to at least partially, or at least indirectly, support a region of the composite charge that extends from, or past, the forming surface or the forming surface edge of the forming surface;

(v) in the collapsed conformation, the composite charge is unsupported by the support surface;

(vi) in the collapsed conformation, the composite charge is fully supported by the forming surface; and (vii) the gap width when the collapsible support is in the collapsed conformation is less than the gap width when the collapsible support is in the extended conformation.

A2. The forming system of paragraph A1, wherein the support surface is a planar, or at least substantially planar, support surface.

A3. The forming system of any of paragraphs A1-A2, wherein the collapsible support is configured to transition from the extended conformation to the collapsed conformation responsive to an atmospheric pressure force.

A4. The forming system of any of paragraphs A1-A3, wherein the collapsible support is configured to be repeatedly transitioned between the extended conformation and the collapsed conformation, optionally without damage to the collapsible support.

A5. The forming system of any of paragraphs A1-A4, wherein the collapsible support includes a biasing mechanism that urges the support surface toward the extended conformation.

A6. The forming system of paragraph A5, wherein the biasing mechanism includes at least one of:
(i) a foam body;
(ii) a spring; and
(iii) an actuator.

A7. The forming system of any of paragraphs A1-A6, wherein the collapsible support includes a support plate that defines the support surface.

A8. The forming system of paragraph A7, wherein the support plate is a rigid, or at least substantially rigid, support plate.

A9. The forming system of any of paragraphs A7-A8, wherein the support plate includes at least one of:
(i) a metallic support plate;
(ii) an aluminum support plate;
(iii) a polymeric support plate;
(iv) a fiberglass support plate; and
(v) a polycarbonate support plate.

A10. The forming system of any of any of paragraphs A7-A9, wherein the support plate includes a double-walled support panel.

A11. The forming system of any of paragraphs A1-A10, wherein the collapsible support further includes an edge protection structure positioned along the die-proximate support surface edge of the support surface.

A12. The forming system of any of paragraphs A1-A11, wherein at least one of the support surface and the die-proximate support surface edge of the support surface is configured to move toward the forming die, as the collapsible support transitions from the extended conformation to the collapsed conformation, optionally wherein said movement comprises at least one of translating, rotating, pivoting, and hinging.

A12.1 The forming system of any of paragraphs A1-A12, wherein at least one of the support surface and the die-proximate support surface edge of the support surface is configured to at least one of:

(i) translate at least partially toward the forming die as the collapsible support transitions from the extended conformation to the collapsed conformation;

(ii) rotate at least partially toward the forming die as the collapsible support transitions from the extended conformation to the collapsed conformation;

(iii) pivot at least partially toward the forming die as the collapsible support transitions from the extended conformation to the collapsed conformation; and (iv) hinge at least partially toward the forming die as the collapsible support transitions from the extended conformation to the collapsed conformation.

A13. The forming system of any of paragraphs A1-A12.1, wherein at least one of:

(i) the first average gap width is a minimum distance between the die-proximate support surface edge of the support surface and the forming surface when the collapsible support is in the extended conformation; and (ii) the second average gap width is a minimum distance between the die-proximate support surface edge of the support surface and the forming surface when the collapsible support is in the collapsed conformation.

A14. The forming system of any of paragraphs A1-A13, wherein the collapsible support includes:

(i) an/the at least substantially rigid support plate that defines the support surface, the die-proximate support surface edge, and a die-distal support surface edge, wherein the support surface extends between the die-proximate support surface edge and the die-distal support surface edge;

(ii) a hinge mechanism that defines a hinge axis that extends parallel, or at least substantially parallel, to an elongate axis of the forming surface, wherein the hinge mechanism is operatively attached to the at least substantially rigid support plate such that the support surface rotates about the hinge axis as the collapsible support transitions between the extended conformation and the collapsed conformation; and (iii) a/the biasing mechanism that urges the support surface toward the extended conformation.

A15. The forming system of paragraph A14, wherein the hinge mechanism is operatively attached to a die-distal support surface edge region of the at least substantially rigid support plate.

A16. The forming system of any of paragraphs A14-A15, wherein the biasing mechanism includes a/the foam body.

A17. The forming system of any of paragraphs A14-A16, wherein the biasing mechanism is positioned proximate a/the die-distal support surface edge region of the at least substantially rigid support plate.

A18. The forming system of any of paragraphs A14-A17, wherein the biasing mechanism is positioned on a charge-opposed side of the at least substantially rigid support plate.

A19. The forming system of any of paragraphs A14-A18, wherein at least one of:

(i) when the collapsible support is in the extended conformation, the support surface is oriented at a skew angle relative to an upper region of the forming surface; and (ii) when the collapsible support is in the collapsed conformation, the support surface is parallel, or at least substantially parallel, to the upper region of the forming surface.

A20. The forming system of any of paragraphs A1-A19, wherein the forming system further includes a base structure that defines a base surface, wherein the forming die is positioned on the base surface, and further wherein the collapsible support is positioned on the base surface.

A21. The forming system of any of paragraphs A1-A20, wherein the forming system further includes a suspension film that extends from the forming surface, across the gap, and to the support surface.

A22. The forming system of paragraph A21, wherein the suspension film is configured to sever as the collapsible support transitions from the extended conformation to the collapsed conformation.

A23. The forming system of any of paragraphs A22-A23, wherein the suspension film includes at least one of:
  (i) a low surface energy polymeric suspension film;
  (ii) a resilient suspension film;
  (iii) a flexible suspension film; and
  (iv) a fluorinated ethylene propylene polymer suspension film.

A24. The forming system of any of paragraphs A1-23, wherein the forming system further includes a bag frame that extends around an external periphery of the vacuum bag and is configured to facilitate positioning of the vacuum bag relative to the forming die.

A25. The forming system of any of paragraphs A1-A24, wherein the forming system further includes a heater configured to heat the composite charge when the composite charge is drape formed by the forming system.

A26. The forming system of paragraph A25, wherein the heater includes at least one heat lamp.

A27. The forming system of any of paragraphs A1-A26, wherein the collapsible support is a first collapsible support positioned adjacent a first side of the forming surface, and further wherein the forming system includes a second collapsible support positioned adjacent a second side of the forming surface.

A28. The forming system of paragraph A27, wherein the second side of the forming surface is opposed to the first side of the forming surface.

A29. The forming system of any of paragraphs A1-A28, wherein the forming die defines an external periphery, and further wherein the collapsible support extends around a threshold fraction of the external periphery.

A30. The forming system of paragraph A29, wherein the threshold fraction includes at least 50%, at least 60%, at least 70%, at least 80%, at least 90%, at least 95%, at least 99%, or 100%.

A31. The forming system of any of paragraphs A29-A30, wherein the external periphery is defined within a plane.

A32. The forming system of any of paragraphs A29-A31, wherein a distance between a first charge-proximate support surface edge of the first collapsible support and a second charge-proximate support surface edge of the second collapsible support decreases as the first collapsible support and the second collapsible support transition from a corresponding extended conformation to a corresponding collapsed conformation.

A33. The forming system of any of paragraphs A1-A32, wherein the forming system includes the composite charge.

A34. The forming system of any of paragraphs A1-A33, wherein the composite charge is positioned within the enclosed volume and is supported by at least a region of the forming surface.

A35. The forming system of any of paragraphs A1-A34, wherein the collapsible support is in the extended conformation, and further wherein the support surface is configured to support at least a region of the composite charge.

A36. The forming system of any of paragraphs A34-A35, wherein the collapsible support is in the collapsed conformation, and further wherein the support surface and the forming surface are oriented, relative to one another, such that at least one of:
  (i) the support surface is configured to be spaced-apart from the composite charge;
  (ii) the composite charge is unsupported by the support surface; and
  (iii) the forming surface is configured to support an entirety of the composite charge.

A37. The forming system of any of paragraphs A1-A36, wherein the composite charge includes a layered charge of composite material.

A38. The forming system of any of paragraphs A1-A37, wherein the composite charge includes a plurality of layers of composite material.

A39. The forming system of any of paragraphs A1-A38, wherein the composite charge includes at least one of:
  (i) a resin-free dry pre-form;
  (ii) fiberglass;
  (iii) fiberglass cloth;
  (iv) carbon fiber;
  (v) carbon fiber cloth;
  (vi) cloth;
  (vii) a resin; and
  (viii) a pre-impregnated composite material.

A40. The forming system of any of paragraphs A1-A39, wherein the forming die includes a layup mandrel.

A41. The forming system of any of paragraphs A1-A40, wherein the vacuum bag includes at least one of:
  (i) a film;
  (ii) a polymeric film;
  (iii) an elastomeric film;
  (iv) a stretchable film;
  (v) a flexible film;
  (vi) a sheet;
  (vii) a polymeric sheet;
  (viii) an elastomeric sheet;
  (ix) a stretchable sheet; and
  (x) a flexible sheet.

A42. The forming system of any of paragraphs A1-A42, wherein the vacuum bag is formed from at least one of:
  (i) rubber; and
  (ii) silicone rubber.

A43. The forming system of any of paragraphs A1-A42, wherein the vacuum source includes at least one of:
  (i) a vacuum pump; and
  (ii) a blower.

A44. The forming system of any of paragraphs A1-A43, wherein:
  (i) the forming surface includes the forming surface edge that bounds the gap; and
  (ii) the support surface includes the die-proximate support surface edge that bounds the gap.

A45. The forming system of paragraph A44, wherein a shape of the die-proximate support surface edge corresponds to a shape of the forming surface edge.

A46. The forming system of any of paragraphs A44-A45, wherein a/the gap width of the gap is constant, or at least substantially constant, along a length of the gap.

A47. The forming system of any of paragraphs A44-A46, wherein:

(i) the forming surface edge has a linear, or at least substantially linear, forming surface edge shape; and (ii) the die-proximate support surface edge has a linear, or at least substantially linear, die-proximate support surface edge shape.

A48. The forming system of any of paragraphs A44-A47, wherein:

(i) the forming surface edge shape has a nonlinear, or arcuate, forming surface edge shape; and (ii) the die-proximate support surface edge has a nonlinear, or arcuate, die-proximate support surface edge shape.

A49. The forming system of any of paragraphs A1-A48, wherein the gap is a nonlinear, or an arcuate, gap.

B1. A method of drape forming a composite charge, the method comprising:

positioning the composite charge within a forming system such that a first region of the composite charge is supported by a forming surface of a forming die and a second region of the composite charge is at least indirectly supported by a support surface of a collapsible support, wherein the support surface and the forming surface define a gap therebetween;

positioning a vacuum bag such that the vacuum bag at least partially defines an enclosed volume that contains the composite charge, the forming surface, and the support surface;

evacuating the enclosed volume; and during the evacuating:

(i) transitioning the collapsible support from an extended conformation to a collapsed conformation;

(ii) decreasing a gap width of the gap as the collapsible support transitions from the extended conformation to the collapsed conformation; and (iii) deforming the composite charge from an initial conformation to a final conformation that defines a desired surface contour.

B2. The method of paragraph B1, wherein the transitioning includes transitioning responsive to the evacuating.

B3. The method of any of paragraphs B1-B2, wherein the method further includes resisting the transitioning with a biasing mechanism of the collapsible support.

B4. The method of any of paragraphs B1-B3, wherein the decreasing includes at least one of:

(i) translating the support surface at least partially toward the forming die;

(ii) rotating the support surface at least partially toward the forming die;

(iii) pivoting the support surface at least partially toward the forming die; and (iv) hinging the support surface at least partially toward the forming die.

B5. The method of any of paragraphs B1-B4, wherein, subsequent to the evacuating, the method includes pressurizing the enclosed volume to atmospheric pressure, and further wherein, during the pressurizing, the method includes extending the collapsible support to the extended conformation.

B6. The method of paragraph B5, wherein the extending is responsive to the pressurizing.

B7. The method of any of paragraphs B1-B6, wherein the positioning the composite charge further includes positioning such that a portion of the second region of the composite charge is supported by a suspension film that extends from the forming surface, across the gap, and to the support surface.

B8. The method of paragraph B7, wherein the method further includes severing the suspension film during the transitioning.

B9. The method of any of paragraphs B1-B8, wherein, prior to the evacuating, the method further includes heating the composite charge.

B10. The method of any of paragraphs B1-B9, wherein the forming system includes any suitable structure of any of the forming systems of any of paragraphs A1-A49.

B11. The method of any of paragraphs B1-B10, wherein the method includes performing the method utilizing the forming system of any of paragraphs A1-A49.

C1. The use of any of the forming systems of any of paragraphs A1-A49 with any of the methods of any of paragraphs B1-B11.

C2. The use of any of the methods of any of paragraphs B1-B11 with any of the forming systems of any of paragraphs A1-A49.

C3. The use of a support surface that moves toward a forming surface of a forming die to at least temporarily support a composite charge during drape forming of the composite charge.

As used herein, the terms "selective" and "selectively," when modifying an action, movement, configuration, or other activity of one or more components or characteristics of an apparatus, mean that the specific action, movement, configuration, or other activity is a direct or indirect result of user manipulation of an aspect of, or one or more components of, the apparatus.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

As used herein, the phrase "at least one," in reference to a list of one or more entities should be understood to mean at least one entity selected from any one or more of the entities in the list of entities, but not necessarily including at least one of each and every entity specifically listed within the list of entities and not excluding any combinations of entities in the list of entities. This definition also allows that entities may optionally be present other than the entities specifically identified within the list of entities to which the phrase "at least one" refers, whether related or unrelated to those entities specifically identified. Thus, as a non-limiting example, "at least one of A and B" (or, equivalently, "at least one of A or B," or, equivalently "at least one of A and/or B") may refer, in one embodiment, to at least one, optionally including more than one, A, with no B present (and optionally including entities other than B); in another embodiment, to at least one, optionally including more than one, B, with no A present (and optionally including entities other than A); in yet another embodiment, to at least one, optionally including more than one, A, and at least one, optionally including more than one, B (and optionally including other entities). In other words, the phrases "at least one," "one or more," and "and/or" are open-ended expressions that are both conjunctive and disjunctive in operation. For example, each of the expressions "at least one of A, B, and C," "at least one of A, B, or C," "one or more of A, B, and C," "one or more of A, B, or C," and "A, B, and/or C" may mean A alone, B alone, C alone, A and B together, A and C together, B and C together, A, B, and C together, and optionally any of the above in combination with at least one other entity.

The various disclosed elements of apparatuses and steps of methods disclosed herein are not required to all apparatuses and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus or method. Accordingly, such inventive subject matter is not required to be associated with the specific apparatuses and methods that are expressly disclosed herein, and such inventive subject matter may find utility in apparatuses and/or methods that are not expressly disclosed herein.

As used herein, the phrase, "for example," the phrase, "as an example," and/or simply the term "example," when used with reference to one or more components, features, details, structures, embodiments, and/or methods according to the present disclosure, are intended to convey that the described component, feature, detail, structure, embodiment, and/or method is an illustrative, non-exclusive example of components, features, details, structures, embodiments, and/or methods according to the present disclosure. Thus, the described component, feature, detail, structure, embodiment, and/or method is not intended to be limiting, required, or exclusive/exhaustive; and other components, features, details, structures, embodiments, and/or methods, including structurally and/or functionally similar and/or equivalent components, features, details, structures, embodiments, and/or methods, are also within the scope of the present disclosure.

As used herein, "at least substantially," when modifying a degree or relationship, may include not only the recited "substantial" degree or relationship, but also the full extent of the recited degree or relationship. A substantial amount of a recited degree or relationship may include at least 75% of the recited degree or relationship. For example, an object that is at least substantially formed from a material includes objects for which at least 75% of the objects are formed from the material and also includes objects that are completely formed from the material. As another example, a first length that is at least substantially as long as a second length includes first lengths that are within 75% of the second length and also includes first lengths that are as long as the second length.

The invention claimed is:

1. A forming system for drape forming a composite charge, the forming system comprising:
    a forming die having a forming surface configured to receive the composite charge; and
    a collapsible support having a support surface that is adjacent the forming surface such that the support surface and the forming surface define a gap therebetween;
    wherein the collapsible support is configured to transition between an extended conformation, in which the support surface is configured to at least indirectly support a region of the composite charge that extends from the forming surface, to a collapsed conformation, in which the composite charge is unsupported by the support surface;
    wherein the collapsible support is configured such that a gap width of the gap decreases as the collapsible support transitions from the extended conformation to the collapsed conformation; and
    wherein the collapsible support includes:
    (i) an at least substantially rigid support plate that defines the support surface, a die-proximate support surface edge, and a die-distal support surface edge, wherein the support surface extends between the die-proximate support surface edge and the die-distal support surface edge;
    (ii) a hinge mechanism that defines a hinge axis that extends at least substantially parallel to an elongate axis of the forming surface, wherein the hinge mechanism is operatively attached to the at least substantially rigid support plate such that the support surface rotates about the hinge axis as the collapsible support transitions between the extended conformation and the collapsed conformation; and
    (iii) a biasing mechanism that urges the support surface toward the extended conformation, wherein the biasing mechanism includes a foam body.

2. The forming system of claim 1, wherein the collapsible support is configured to be repeatedly transitioned between the extended conformation and the collapsed conformation.

3. The forming system of claim 1, wherein the collapsible support includes a biasing mechanism that urges the support surface toward the extended conformation.

4. The forming system of claim 1, wherein the collapsible support includes a support plate that defines the support surface, wherein the support plate is an at least substantially rigid support plate.

5. The forming system of claim 1, wherein the collapsible support further includes an edge protection structure positioned along a die-proximate support surface edge of the support surface.

6. The forming system of claim 1, wherein at least one of the support surface and a die-proximate support surface edge of the support surface is configured to move toward the forming die, as the collapsible support transitions from the extended conformation to the collapsed conformation, wherein said movement comprises rotation.

7. The forming system of claim 1, wherein the hinge mechanism is operatively attached to a die-distal support surface edge region of the at least substantially rigid support plate.

8. The forming system of claim 1, wherein the biasing mechanism is positioned proximate a die-distal support surface edge region of the at least substantially rigid support plate.

9. The forming system of claim 1, wherein at least one of:
    (i) when the collapsible support is in the extended conformation, the support surface is oriented at a skew angle relative to an upper region of the forming surface; and
    (ii) when the collapsible support is in the collapsed conformation, the support surface is at least substantially parallel to the upper region of the forming surface.

10. The forming system of claim 1, wherein the collapsible support is a first collapsible support positioned adjacent a first side of the forming surface, and further wherein the forming system includes a second collapsible support positioned adjacent a second side of the forming surface.

11. The forming system of claim 10, wherein the second side of the forming surface is opposed to the first side of the forming surface.

12. The forming system of claim 10, wherein a distance between a first charge-proximate support surface edge of the first collapsible support and a second charge-proximate support surface edge of the second collapsible support decreases as the first collapsible support and the second collapsible support transition from a corresponding extended conformation to a corresponding collapsed conformation.

13. The forming system of claim 1, wherein the collapsible support is in the extended conformation, and further wherein the support surface is configured to support at least the region of the composite charge.

14. The forming system of claim 1, wherein the collapsible support is in the collapsed conformation, and further wherein the support surface and the forming surface are oriented, relative to one another, such that at least one of:
(i) the support surface is configured to be spaced-apart from the composite charge;
(ii) the composite charge is configured to be unsupported by the support surface; and
(iii) the forming surface is configured to support an entirety of the composite charge.

15. A method of drape forming a composite charge, the method comprising:
positioning the composite charge within the forming system of claim 1 such that a first region of the composite charge is supported by the forming surface and a second region of the composite charge is at least indirectly supported by the support surface;
transitioning the collapsible support from the extended conformation to the collapsed conformation;
decreasing the gap width of the gap as the collapsible support transitions from the extended conformation to the collapsed conformation; and
deforming the composite charge from an initial conformation to a final conformation that defines a desired surface contour as the collapsible support transitions from the extended conformation to the collapsed conformation.

16. The method of claim 15, wherein the method further includes:
positioning a vacuum bag such that the vacuum bag at least partially defines an enclosed volume that contains the composite charge, the forming surface, and the support surface; and
evacuating the enclosed volume;
wherein the transitioning includes transitioning responsive to the evacuating.

17. The method of claim 16, wherein, subsequent to the evacuating, the method includes pressurizing the enclosed volume to atmospheric pressure, and further wherein, during the pressurizing, the method includes returning the collapsible support to the extended conformation.

18. The method of claim 15, wherein the transitioning includes at least one of:
(i) translating the support surface at least partially toward the forming die; and
(ii) rotating the support surface at least partially toward the forming die.

19. A forming system for drape forming a composite charge, the forming system comprising:
a forming die having a forming surface configured to receive the composite charge; and
a collapsible support having a support surface that is adjacent the forming surface such that the support surface and the forming surface define a gap therebetween;
wherein the collapsible support is configured to transition between an extended conformation, in which the support surface is configured to at least indirectly support a region of the composite charge that extends from the forming surface, to a collapsed conformation, in which the composite charge is unsupported by the support surface;
wherein the collapsible support is configured such that a gap width of the gap decreases as the collapsible support transitions from the extended conformation to the collapsed conformation;
wherein the collapsible support includes:
(i) an at least substantially rigid support plate that defines the support surface, a die-proximate support surface edge, and a die-distal support surface edge, wherein the support surface extends between the die-proximate support surface edge and the die-distal support surface edge;
(ii) a hinge mechanism that defines a hinge axis that extends at least substantially parallel to an elongate axis of the forming surface, wherein the hinge mechanism is operatively attached to the at least substantially rigid support plate such that the support surface rotates about the hinge axis as the collapsible support transitions between the extended conformation and the collapsed conformation; and
(iii) a biasing mechanism that urges the support surface toward the extended conformation; and
wherein at least one of:
(i) when the collapsible support is in the extended conformation, the support surface is oriented at a skew angle relative to an upper region of the forming surface; and
(ii) when the collapsible support is in the collapsed conformation, the support surface is at least substantially parallel to the upper region of the forming surface.

20. A forming system for drape forming a composite charge, the forming system comprising:
a forming die having a forming surface configured to receive the composite charge; and
a collapsible support having a support surface that is adjacent the forming surface such that the support surface and the forming surface define a gap therebetween;
wherein the collapsible support is configured to transition between an extended conformation, in which the support surface is configured to at least indirectly support a region of the composite charge that extends from the forming surface, to a collapsed conformation, in which the composite charge is unsupported by the support surface;
wherein the collapsible support is configured such that a gap width of the gap decreases as the collapsible support transitions from the extended conformation to the collapsed conformation;
wherein the collapsible support is a first collapsible support positioned adjacent a first side of the forming surface;

wherein the forming system includes a second collapsible support positioned adjacent a second side of the forming surface; and wherein a distance between a first charge-proximate support surface edge of the first collapsible support and a second charge-proximate support surface edge of the second collapsible support decreases as the first collapsible support and the second collapsible support transition from a corresponding extended conformation to a corresponding collapsed conformation.

* * * * *